United States Patent
Sawano et al.

(10) Patent No.: US 11,277,023 B2
(45) Date of Patent: Mar. 15, 2022

(54) POWER FEEDING CONTROL DEVICE, POWER FEEDING CONTROL METHOD, AND COMPUTER PROGRAM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Shunichi Sawano, Yokkaichi (JP); Shinji Nouda, Yokkaichi (JP); Masayuki Kato, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

(*) Notice: Subject to any disclaimer, the term of this patent is extended or adjusted under 35 U.S.C. 154(b) by 40 days.

(21) Appl. No.: 16/968,221

(22) PCT Filed: Jan. 24, 2019

(86) PCT No.: PCT/JP2019/002174
§ 371 (c)(1),
(2) Date: Aug. 7, 2020

(87) PCT Pub. No.: WO2019/155890
PCT Pub. Date: Aug. 15, 2019

(65) Prior Publication Data
US 2021/0384757 A1  Dec. 9, 2021

(30) Foreign Application Priority Data

Feb. 7, 2018 (JP) .............................. JP2018-020401

(51) Int. Cl.
*H02J 7/34* (2006.01)
*H02J 1/14* (2006.01)

(52) U.S. Cl.
CPC ................ *H02J 7/345* (2013.01); *H02J 1/14* (2013.01); *H02J 2310/40* (2020.01)

(58) Field of Classification Search
CPC .......... H02J 7/345; H02J 1/14; H02J 2310/40
See application file for complete search history.

(56) References Cited

U.S. PATENT DOCUMENTS 9,793,722 B2 * 10/2017 Tamura .................... B60L 1/00

FOREIGN PATENT DOCUMENTS

| JP | 2003-047148 A | 2/2003 |
|----|---------------|--------|
| JP | 2013-143905 A | 7/2013 |
| JP | 2013-236297 A | 11/2013 |
| JP | 2018-013456 A | 1/2018 |

OTHER PUBLICATIONS

International Search Report, Application No. PCT/JP2019/002174, dated Feb. 4, 2019. ISA/Japan Patent Office.

* cited by examiner

*Primary Examiner* — Carlos Amaya
(74) *Attorney, Agent, or Firm* — Honigman LLP

(57) ABSTRACT

In a power feeding control device, a control unit determines whether or not a current is flowing through at least one of the first switches, when an instruction to turn off first switches has been given. If it is determined that a current is flowing, the control unit causes a first capacitor to discharge via a current path of the current flowing through a second switch.

9 Claims, 11 Drawing Sheets

POWER FEEDING CONTROL DEVICE, POWER FEEDING CONTROL METHOD, AND COMPUTER PROGRAM

CROSS-REFERENCE TO RELATED APPLICATIONS

This application is the U.S. national stage of PCT/JP2019/002174 filed on Jan. 24, 2019, which claims priority of Japanese Patent Application No. JP 2018-020401 filed on Feb. 7, 2018, the contents of which are incorporated herein.

TECHNICAL FIELD

The present disclosure relates to a power feeding control device, a power feeding control method, and a computer program.

BACKGROUND

Vehicles are provided with a power feeding control device (see, for example, JP 2013-143905A) for controlling the feeding of power from a battery to a load. In the power feeding control device disclosed in JP 2013-143905A, a semiconductor switch is provided in a current path of a current flowing from the battery to the load, and is turned on or off, so that power feeding from the battery to the load is controlled.

The semiconductor switch has a control terminal. If the semiconductor switch is a Field Effect Transistor (FET) for example, the control terminal is a gate. The value of the resistance between two terminals of the semiconductor switch varies according to the voltage at the control terminal. By adjusting the value of the resistance between the two terminals of the semiconductor switch to a sufficiently small value through adjustment of the voltage at the control terminal, the semiconductor switch is turned on. By adjusting the value of the resistance between the two terminals of the semiconductor switch to a sufficiently large value through adjustment of the voltage at the control terminal, the semiconductor switch is turned off.

An example of failure of a semiconductor switch is a halfway-on failure. "Halfway-on failure" refers to a phenomenon in which the value of the resistance between two terminals of the semiconductor switch cannot be adjusted to a sufficiently large value or a sufficiently small value by adjusting the voltage at a control terminal. When a halfway-on failure has occurred, the value of the resistance between the two terminals of the semiconductor switch is not sufficiently large, and thus a current flows through the semiconductor switch and the semiconductor switch generates heat.

The amount of heat generation of the semiconductor switch is larger, the larger the product of the value of the resistance between the two terminals of the semiconductor switch and the square of the current value of the current flowing through the semiconductor switch is. When a halfway-on failure has occurred, the value of the resistance between the two terminals of the semiconductor switch is not sufficiently small, and thus the amount of heat generation of the semiconductor switch is large. Therefore, when a halfway-on failure has occurred in the semiconductor switch, the temperature of the semiconductor switch may increase to a rated temperature or higher. Accordingly, if a halfway-on failure occurs, it will be necessary to suppress an increase in the temperature of the semiconductor switch by adjusting the current value of a current that flows through the semiconductor switch.

It is an object of the present disclosure to provide a power feeding control device, a power feeding control method, and a computer program that can suppress an increase in the temperature of a semiconductor switch if a halfway-on failure occurs.

SUMMARY

According to one aspect of the present disclosure, a power feeding control device incudes: a semiconductor switch provided in a first current path of a current flowing from a capacitor; an instructing unit configured to give an instruction to turn off the semiconductor switch; a determination unit configured to determine whether or not a current is flowing through the semiconductor switch, when the instructing unit has given an instruction to turn off the semiconductor switch; and a discharge control unit configured to, if it is determined by the determination unit that a current is flowing, cause the capacitor to discharge via a second current path of a current flowing from the capacitor, or cause the capacitor to stop discharging.

According to one aspect of the present disclosure, a power feeding control method includes the steps of giving an instruction to turn off a semiconductor switch provided in a first current path of a current flowing from a capacitor; determining whether or not a current is flowing through the semiconductor switch, when the instruction to turn off the semiconductor switch has been given; and if it is determined that a current is flowing, causing the capacitor to discharge via a second current path of a current flowing from the capacitor, or causing the capacitor to stop discharging.

According to one aspect of the present disclosure, a computer program causes a computer to execute the steps of giving an instruction to turn off a semiconductor switch provided in a first current path of a current flowing from a capacitor; determining whether or not a current is flowing through the semiconductor switch, when the instruction to turn off the semiconductor switch has been given; and if it is determined that a current is flowing, causing the capacitor to discharge via a second current path of a current flowing from the capacitor, or causing the capacitor to stop discharging.

Note that the present invention can be realized not only as a power feeding control device that includes the above-described characteristic processing units, but also a power feeding control method that includes the above-described characteristic processing as steps, as well as a computer program for causing a computer to execute these steps. Also, the present invention can be realized as a semiconductor integrated circuit that realizes part or entirety of the power feeding control device, or a power feeding control system that includes the power feeding control device.

Effects of Present Disclosure

According to the present disclosure, it is possible to suppress an increase in the temperature of a semiconductor switch if a halfway-on failure occurs.

DETAILED DESCRIPTION OF PREFERRED EMBODIMENTS

Figure 1:
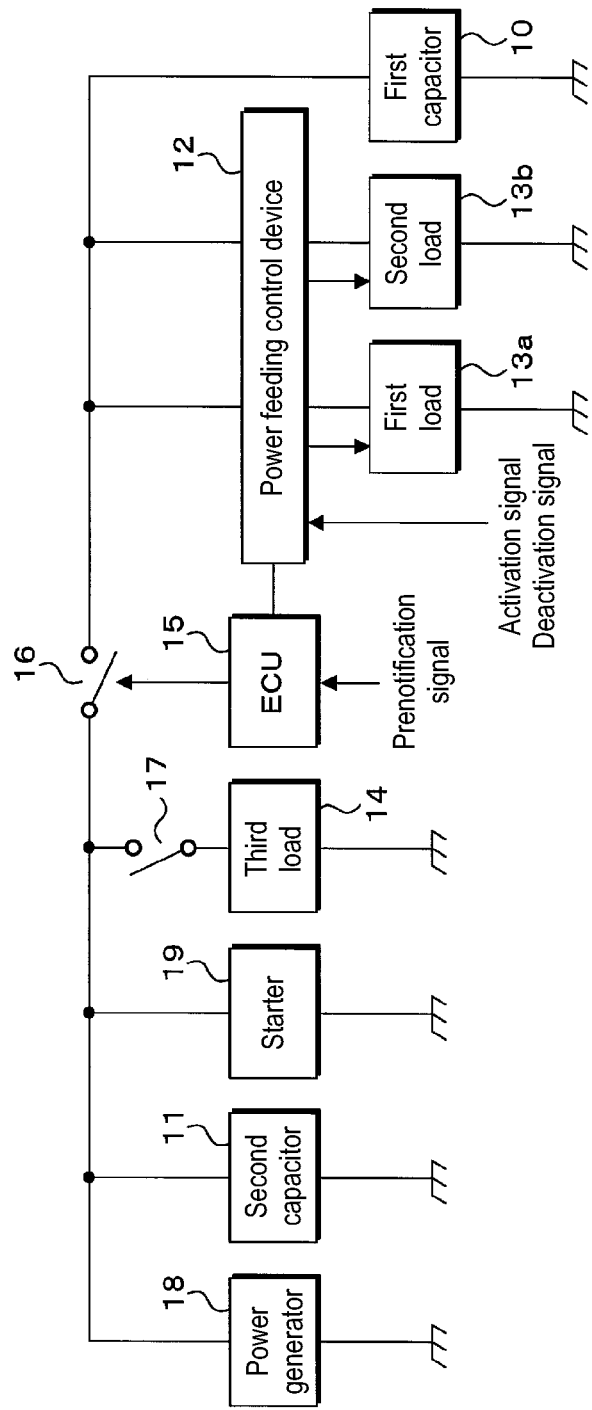
FIG. 1 is a block diagram illustrating a configuration of a main portion of a power supply system according to Embodiment 1.

First, aspects of implementation of the present disclosure will be listed and described. At least some of the following embodiments may also be combined as desired.

According to one aspect of the present disclosure, a power feeding control device includes: a semiconductor switch provided in a first current path of a current flowing from a capacitor; an instructing unit configured to give an instruction to turn off the semiconductor switch; a determination unit configured to determine whether or not a current is flowing through the semiconductor switch, when the instructing unit has given an instruction to turn off the semiconductor switch; and a discharge control unit configured to, if it is determined by the determination unit that a current is flowing, cause the capacitor to discharge via a second current path of a current flowing from the capacitor, or cause the capacitor to stop discharging.

In the power feeding control device according to one aspect of the present disclosure, the determination unit may determine that a current is flowing, if a voltage at one terminal, on the down-stream side, of the semiconductor switch is equal to or greater than a predetermined voltage when the instructing unit has given an instruction to turn off the semiconductor switch.

In the power feeding control device according to one aspect of the present disclosure, a power generator may charge the capacitor via a connection switch, and may supply electric power via the connection switch and the semiconductor switch, and the power feeding control device may further include an off signal output unit configured to, if it is determined by the determination unit that a current is flowing, output an off signal for giving an instruction to turn off the connection switch.

In the power feeding control device according to one aspect of the present disclosure, a current switch provided in the second current path may further be provided, wherein, by giving an instruction to turn on the current switch, the discharge control unit causes the capacitor to discharge via the second current path.

In the power feeding control device according to one aspect of the present disclosure, the capacitor may supply electric power to a load via the second current path, and the power feeding control device may further include an operation signal output unit configured to, if it is determined by the determination unit that a current is flowing, output an operation signal for instructing the load to perform a predetermined operation.

In the power feeding control device according to one aspect of the present disclosure, by giving an instruction to turn off an input/output switch whose one end is connected to the capacitor, the discharge control unit may cause the capacitor to stop discharging.

According to one aspect of the present disclosure, a power feeding control method includes the steps of giving an instruction to turn off a semiconductor switch provided in a first current path of a current flowing from a capacitor; determining whether or not a current is flowing through the semiconductor switch, when the instruction to turn off the semiconductor switch has been given; and if it is determined that a current is flowing, causing the capacitor to discharge via a second current path of a current flowing from the capacitor, or causing the capacitor to stop discharging.

According to one aspect of the present disclosure, a computer program causes a computer to execute the steps of giving an instruction to turn off a semiconductor switch provided in a first current path of a current flowing from a capacitor; determining whether or not a current is flowing through the semiconductor switch, when the instruction to turn off the semiconductor switch has been given; and if it is determined that a current is flowing, causing the capacitor to discharge via a second current path of a current flowing from the capacitor, or causing the capacitor to stop discharging.

With the power feeding control device, the power feeding control method, and the computer program according to the above-described aspects, when a halfway-on failure has occurred in a semiconductor switch, a current flows through the semiconductor switch even in a state in which an instruction to turn off the semiconductor switch has been given. If it is determined that a current is flowing through the semiconductor switch when an instruction to turn off the semiconductor switch has been given, the capacitor discharges via the second current path, which is different from the first current path, or stops discharging. When the capacitor discharges via the second current path, the output voltage at the capacitor is reduced with time. Due to the discharge via the second current path or the stop of discharging, the current value of the current flowing through the semiconductor switch in which the halfway-on failure has occurred is reduced, which suppresses an increase in the temperature of the semiconductor switch.

In the power feeding control device according to the above-described aspect, for example, the capacitor supplies electric power to a load via the semiconductor switch. In this case, when a current is flowing through the semiconductor switch, the voltage at one terminal, on the down-stream side, of the semiconductor switch exceeds 0V. In the same case, when no current is flowing through the semiconductor switch, no current is flowing to the load, and thus the voltage at one terminal, on the down-stream side, of the semiconductor switch is 0V. In the state in which an instruction to turn off the semiconductor switch has been given, if the voltage on the down-stream side of the semiconductor switch is equal to or greater than a predetermined voltage, it is determined that a current is flowing through the semiconductor switch.

In the power feeding control device according to the above-described aspect, if it is determined that a current is flowing through the semiconductor switch, the connection switch is turned off, and charging of the capacitor from the power generator, and power feeding of the power generator via the semiconductor switch are prohibited. In a state in which the connection switch is OFF, the capacitor discharges via the second current path, or the capacitor stops discharging.

In the power feeding control device according to the above-described aspect, if it is determined that a current is flowing through the semiconductor switch, the current switch is turned on. Accordingly, the capacitor discharges via the second current path, and the output voltage at the capacitor is reduced.

In the power feeding control device according to the above-described aspect, if it is determined that a current is flowing through the semiconductor switch, an operation signal is output. Accordingly, the load supplied with electric power via the second current path by the capacitor performs a predetermined operation, and a notification on the failure that has occurred is given.

In the power feeding control device according to the above-described aspect, if it is determined that a current is flowing through the semiconductor switch, the input/output switch is turned off. Accordingly, the capacitor stops discharging.

The following will describe specific examples of power supply systems according to embodiments of the present invention with reference to the drawings. Note that the present invention is not limited to these examples, but is defined by the claims, and is intended to encompass all modifications within the meanings and scope that are equivalent to the claims.

Embodiment 1

FIG. 1 is a block diagram showing a configuration of a main portion of a power supply system 1 according to Embodiment 1. The power supply system 1 is suitably installed in a vehicle, and includes a first capacitor 10, a second capacitor 11, a power feeding control device 12, a first load 13a, a second load 13b, a third load 14, an Electronic Control Unit (ECU) 15, a connection switch 16, a power feeding switch 17, a power generator 18, and a starter 19. Each of the first capacitor 10 and the second capacitor 11 is a DC power supply, and is, for example, a battery.

The positive electrode of the first capacitor 10 is connected to one end of the connection switch 16. Connection nodes between the first capacitor 10 and the connection switch 16 are connected to the power feeding control device 12. The power feeding control device 12 is further connected to the first load 13a, the second load 13b, and the ECU 15. The negative electrode of the first capacitor 10, and the other ends of the first load 13a and the second load 13b are grounded.

The other end of the connection switch 16 is connected to the positive electrode of the second capacitor 11, and one end of the power feeding switch 17, the power generator 18, and the starter 19. The other end of the power feeding switch 17 is connected to one end of the third load 14. The negative electrode of the second capacitor 11, and the other end of the third load 14, the power generator 18, and the starter 19 are grounded. The power generator 18 generates AC power with an engine of the vehicle. The power generator 18 rectifies the generated AC power into DC power, and supplies the rectified DC power. The power generator 18 generates electric power at an appropriate timing while the engine operates. The power generator 18 does not generate electric power when the engine does not operate.

The starter 19 is a motor for activating the engine. During the operation of the starter 19, the power generator 18 does not generate electric power.

When the power generator 18 is generating electric power, the power generator 18 charges the second capacitor 11. In the same case, if the power feeding switch 17 is ON, the power generator 18 supplies the electric power to the third load 14 via the power feeding switch 17. In the same case, when the connection switch 16 is ON, the power generator 18 charges the first capacitor 10 via the connection switch 16, and supplies the electric power to the first load 13a and the second load 13b via the connection switch 16 and the power feeding control device 12.

The second capacitor 11 supplies electric power to the starter 19. It is assumed that, when the power generator 18 is deactivated, the connection switch 16 and the power feeding switch 17 are ON. In this state, if the output voltage at the first capacitor 10 is higher than the output voltage at the second capacitor 11, the first capacitor 10 charges the second capacitor 11, supplies electric power to the first load 13a and the second load 13b via the power feeding control device 12, and supplies electric power to the third load 14. In the same case, if the output voltage at the second capacitor 11 is higher than the output voltage at the first capacitor 10, the second capacitor 11 charges the first capacitor 10, supplies electric power to the first load 13a and the second load 13b via the power feeding control device 12, and supplies electric power to the third load 14.

In the case where the power generator 18 is deactivated, if the connection switch 16 is OFF, the first capacitor 10 supplies electric power to the first load 13a and the second load 13b via the power feeding control device 12. In the same case, if the connection switch 16 is OFF and the power feeding switch 17 is ON, the second capacitor 11 supplies electric power to the third load 14. If the power feeding switch 17 is OFF, no electric power is supplied to the third load 14.

The first load 13a, the second load 13b, and the third load 14 are electric devices installed in a vehicle. The first load 13a, the second load 13b, and the third load 14 are activated when electric power is supplied, and are deactivated when no electric power is supplied.

As described above, the first capacitor 10, the second capacitor 11, or the power generator 18 supplies electric power to the first load 13a and the second load 13b via the power feeding control device 12. The power feeding control device 12 controls power feeding to the first load 13a and the second load 13b. The power feeding control device 12 electrically connects the connection node between the first capacitor 10 and the connection switch 16, to one end of the first load 13a. Accordingly, the first load 13a is fed electric power from the first capacitor 10, the second capacitor 11, or the power generator 18. The power feeding control device 12 interrupts the electrical connection between a connection node between the first capacitor 10 and the connection switch 16, and the one end of the first load 13a. Accordingly, the power feeding to the first load 13a is stopped.

Similarly, the power feeding control device 12 electrically connects a connection node between the first capacitor 10 and the connection switch 16, to one end of the second load 13b. Accordingly, the second load 13b is fed electric power from the first capacitor 10, the second capacitor 11, or the power generator 18. The power feeding control device 12 interrupts the electrical connection between the connection node between the first capacitor 10 and the connection switch 16, and the one end of the second load 13b. Accordingly, the power feeding to the second load 13b is stopped.

An activation signal that indicates any of the first load 13a and the second load 13b that is to be activated, and a deactivation signal that indicates any of the first load 13a and the second load 13b that is to be deactivated are input to the power feeding control device 12. Upon input of the activation signal, the power feeding control device 12 electrically connects the connection node between the first capacitor 10 and the connection switch 16, and the load indicated by the activation signal. Accordingly, electric power is fed to the load indicated by the activation signal, and the load indicated by the activation signal is activated. Upon input of the deactivation signal, the power feeding control device 12 interrupts the electrical connection between the connection node between the first capacitor 10 and the connection switch 16, and the load indicated by the deactivation signal. Accordingly, the power feeding to the load indicated by the deactivation signal is stopped, and the load indicated by the deactivation signal is deactivated.

In the power feeding control device 12, there is a likelihood that a halfway-on failure may occur as will be described later. If a halfway-on failure occurs, the power feeding control device 12 controls the power feeding to the first load 13a and the second load 13b, irrespective of an input activation signal and deactivation signal, and outputs, to the ECU 15, an OFF signal for instructing turning off of the connection switch 16.

When the power feeding switch 17 is turned on, the first capacitor 10, the second capacitor 11, or the power generator 18 feeds electric power to the third load 14, and the third load 14 is activated. When the power feeding switch 17 is turned off, the power feeding to the third load 14 is stopped, and the third load 14 is deactivated.

The third load 14 is, for example, an electric device essential for driving a vehicle, and is activated while the engine operates.

Furthermore, a prenotification signal for giving a notification regarding activation of the starter 19 is also input to the ECU 15. Upon input of the prenotification signal, the ECU 15 turns the connection switch 16 off. After predetermined time has elapsed since the connection switch 16 was switched off, the ECU 15 turns the connection switch 16 on.

When the connection switch 16 is OFF, the starter 19 starts the engine. During the operation, the starter 19 consumes power stored in the second capacitor 11. After the start of the engine, the starter 19 is deactivated. While the connection switch 16 is OFF, the starter 19 is activated and deactivated. As described above, when the connection switch 16 is OFF, the first capacitor 10 supplies electric power to the first load 13a and the second load 13b.

In the second capacitor 11, a current flows through a not-shown internal resistor. While the starter 19 operates, the current value of a current flowing from the second capacitor 11 to the starter 19 is high. Accordingly, while the starter 19 operates, a large voltage drop occurs in the internal resistor of the second capacitor 11, and the output voltage at the second capacitor 11 is reduced significantly.

While the starter 19 operates, the connection switch 16 is OFF, and the first capacitor 10 supplies electric power to the first load 13a and the second load 13b. Accordingly, even if the starter 19 is activated and the output voltage at the second capacitor 11 is reduced, the voltages applied to the first load 13a and the second load 13b will hardly be reduced.

As described above, an OFF signal is input to the ECU 15 from the power feeding control device 12. Upon input of the OFF signal, the ECU 15 turns the connection switch 16 off. Accordingly, charging of the first capacitor 10 from each of the second capacitor 11 and the power generator 18, and power feeding of the second capacitor 11 and the power generator 18 via the power feeding control device 12 are prohibited. If a halfway-on failure occurs, the power feeding control device 12 reduces the output voltage at the first capacitor 10 while maintaining the connection switch 16 in the OFF state.

The power feeding control device 12 outputs, to the first load 13a, a first operation signal for instructing the first load 13a to perform a predetermined first operation. Upon input of the first operation signal, the first load 13a executes the first operation.

Similarly, the power feeding control device 12 outputs, to the second load 13b, a second operation signal for instructing the second load 13b to perform a predetermined second operation. Upon input of the second operation signal, the second load 13b executes the second operation.

If the first load 13a or the second load 13b is, for example, an interior light, the first operation or the second operation is to blink on and off the interior light. If the first load 13a or the second load 13b is, for example, a rear windshield wiper, the first operation or the second operation is to rotate the rear windshield wiper in forward and backward directions from one end serving as a starting point.

If a halfway-on failure occurs, the power feeding control device 12 outputs the first operation signal or the second operation signal, so as to control the first load 13a or the second load 13b to perform the first operation or the second operation. Accordingly, a notification on the failure is given.

Note that the first operation is preferably an operation that is performed by the first load 13a only when the first operation signal was input to the first load 13a. Also, the second operation is preferably an operation that is performed by the second load 13b only when the second operation signal was input to the second load 13b.

Figure 2:
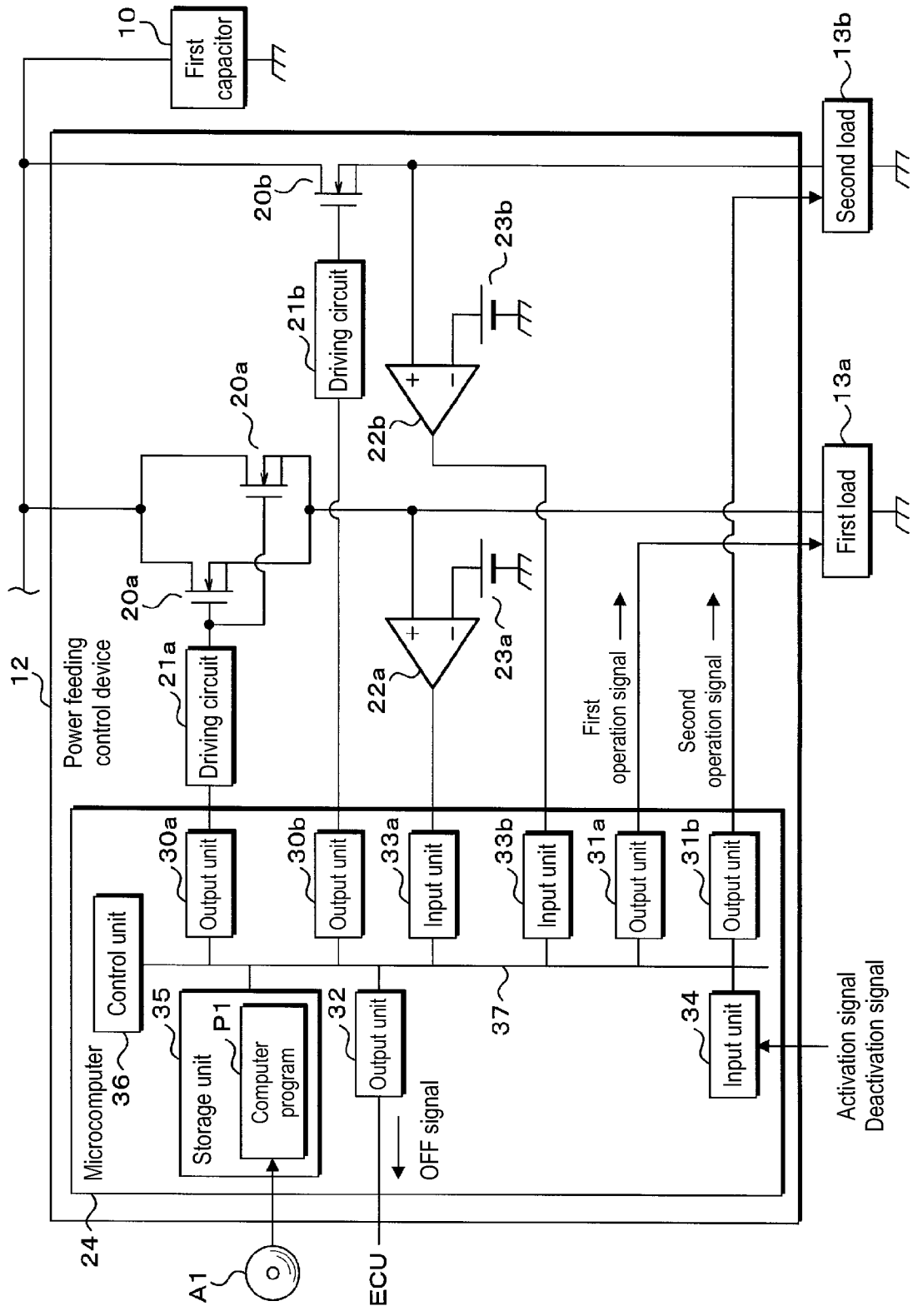
FIG. 2 is a block diagram illustrating a configuration of a main portion of a power feeding control device.

FIG. 2 is a block diagram showing a configuration of a main portion of the power feeding control device 12. The power feeding control device 12 includes first switches 20a, a second switch 20b, driving circuits 21a and 21b, comparators 22a and 22b, DC power supplies 23a and 23b, and a microcomputer 24. The first switches 20a and the second switch 20b are N-channel type FETs. An FET is a semiconductor switch. The comparators 22a and 22b each have a plus terminal, a minus terminal, and an output terminal. The microcomputer 24 has output units 30a, 30b, 31a, 31b, and 32, input units 33a, 33b, and 34, a storage unit 35, and a control unit 36.

The drains of the first switches 20a are connected to a connection node between the first capacitor 10 and the connection switch 16. The sources of the first switches 20a are connected to one end of the first load 13a. The gates of the first switches 20a are connected to the driving circuit 21a. The driving circuit 21a is further connected to the output unit 30a of the microcomputer 24. The sources of the first switches 20a are further connected to the plus terminal of the comparator 22a. The minus terminal of the comparator 22a is connected to the positive electrode of the DC power supply 23a. The negative electrode of the DC power supply 23a is grounded. The output terminal of the comparator 22a is connected to the input unit 33a of the microcomputer 24.

The drain of the second switch 20b is connected to a connection node between the first capacitor 10 and the connection switch 16. The source of the second switch 20b is connected to one end of the second load 13b. The gate of the second switch 20b is connected to the driving circuit 21b. The driving circuit 21b is further connected to the output unit 30b of the microcomputer 24. The source of the second switch 20b is further connected to the plus terminal of the comparator 22b. The minus terminal of the comparator 22b is connected to the positive electrode of the DC power supply 23b. The negative electrode of the DC power supply 23b is grounded. The output terminal of the comparator 22b is connected to the input unit 33b of the microcomputer 24.

In the microcomputer 24, the output units 30a, 30b, 31a, 31b, and 32, the input units 33a, 33b, and 34, the storage unit 35, and the control unit 36 are connected to an internal bus 37. The output unit 32 is further connected to the ECU 15.

In each of the first switches 20a and the second switch 20b, if the voltage at the gate relative to the potential of the source is equal to or greater than an ON voltage, the value of the resistance between the drain and the source is sufficiently small, and a current can flow through the drain and the source. At this time, the first switches 20a and the second switch 20b are ON.

Furthermore, in each of the first switches 20a and the second switch 20b, if the voltage at the gate relative to the potential of the source is less than an OFF voltage, the value of the resistance between the drain and the source is sufficiently large, and no current will flow through the drain and the source. At this time, the first switches 20a and the second switch 20b are OFF.

The ON voltages and the OFF voltages of the first switches 20a and the second switch 20b are constant, and the ON voltages are higher than the OFF voltages. The ON voltages of the first switches 20a are substantially the same, and the OFF voltages of the first switches 20a are also substantially the same.

The output unit 30a outputs a high level voltage or a low level voltage to the driving circuit 21a. The output unit 30a switches the voltage that it outputs to the driving circuit 21a to the high level voltage or the low level voltage in accordance with an instruction of the control unit 36. When the voltage that is output by the output unit 30a is switched from the low level voltage to the high level voltage, the driving circuit 21a increases the voltage at the gate of the first switches 20a relative to the ground potential. Accordingly, in each of the first switches 20a, the voltage at the gate relative to the potential of the source is equal to or greater than the ON voltage, and the first switches 20a are turned on at substantially the same time. Accordingly, the connection node between the first capacitor 10 and the connection switch 16 is electrically connected to the first load 13a.

Hereinafter, the voltage at the gate of each of the first switches 20a relative to the ground potential is referred to as a first gate voltage, and the voltage at the source of each of the first switches 20a relative to the ground potential is referred to as a first source voltage.

When the first switches 20a are ON, a current flows from the first capacitor 10, the second capacitor 11, or the power generator 18 to the first load 13a via the first switches 20a. At this time, in each of the first switches 20a, a current flows through the drain and the source in this order. Accordingly, the source of the first switch 20a is a terminal located on the down-stream side.

Here, since the two first switches 20a are connected in parallel to each other, the current amount of a current flowing through each of the first switches 20a is small. Therefore, the amount of heat generation of each of the first switches 20a is small.

The first switches 20a are provided in a current path of a current flowing from the first capacitor 10. The first capacitor 10 supplies electric power to the first load 13a via this current path. When the power generator 18 generates electric power, and the connection switch 16 and the first switches 20a are ON, the power generator 18 supplies the electric power to the first load 13a via the connection switch 16 and the first switches 20a.

When the voltage output from the output unit 30a is switched from the high level voltage to the low level voltage, the driving circuit 21a reduces the first gate voltage. Accordingly, in each of the first switches 20a, the voltage at the gate relative to the potential of the source is less than the OFF voltage, and the first switches 20a are turned off. Accordingly, the electrical connection between the connection node between the first capacitor 10 and the connection switch 16, and the first load 13a is interrupted.

If the first source voltage is higher than a first threshold voltage, which is a voltage between two ends of the DC power supply 23a, the comparator 22a outputs a high level voltage to the input unit 33a of the microcomputer 24. If the first source voltage is less than the first threshold voltage, the comparator 22a outputs a low level voltage to the input unit 33a of the microcomputer 24. The input unit 33a notifies the control unit 36 of the voltage output by the comparator 22a. The first threshold voltage is a constant voltage.

If the voltage applied to the first load 13a is equal to or greater than a constant first operation voltage, the first load 13a is activated. If the voltage applied to the first load 13a is less than the first operation voltage, the first load 13a is deactivated. The first threshold voltage is a voltage that is equal to or less than the first operation voltage.

The second switch 20b, the driving circuit 21b, the comparator 22b, the DC power supply 23b, the output unit 30b, and the input unit 33b respectively function in the same manner as the first switch 20a, the driving circuit 21a, the comparator 22a, the DC power supply 23a, the output unit 30a, and the input unit 33a.

Therefore, the output unit 30b switches the voltage that it outputs to the driving circuit 21b to a high level voltage or a low level voltage in accordance with an instruction from the control unit 36. When the voltage output by the output unit 30b has been switched to the high level voltage or the low level voltage, the driving circuit 21b adjusts the voltage at the gate of the second switch 20b relative to the ground potential, and turns the second switch 20b on or off. When the second switch 20b is turned on, the connection node between the first capacitor 10 and the connection switch 16 is electrically connected to the second load 13b. When the second switch 20b is turned off, the electrical connection between the connection node between the first capacitor 10 and the connection switch 16, and the second load 13b is interrupted.

When the second switch 20b is ON, a current flows from the first capacitor 10, the second capacitor 11, or the power generator 18 to the second load 13b via the second switch 20b. At this time, in the second switch 20b, a current flows through the drain and the source in this order. The source of the second switch 20b is also a terminal located on the down-stream side. The second switch 20b is provided in a current path of a current flowing from the first capacitor 10. The first capacitor 10 supplies electric power to the second load 13b via this current path. When the power generator 18 generates electric power, and the connection switch 16 and the second switch 20b are ON, the power generator 18 supplies the electric power to the second load 13b via the connection switch 16 and the second switch 20b.

If the voltage at the source of the second switch 20b is equal to or higher than a second threshold voltage, which is a voltage between two end of the DC power supply 23b, the comparator 22b outputs a high level voltage to the input unit 33b of the microcomputer 24. If the voltage at the source of the second switch 20b relative to the ground potential is less than the second threshold voltage, the comparator 22b outputs a low level voltage to the input unit 33b of the microcomputer 24. The input unit 33b notifies the control unit 36 of the voltage output by the comparator 22b. The second threshold voltage is a constant voltage.

If the voltage applied to the second load 13b is equal to or greater than a constant second operation voltage, the second load 13b is activated. If the voltage applied to the second load 13b is less than the second operation voltage, the second load 13b is deactivated. The second threshold voltage is equal to or less than the second operation voltage.

The output unit 31a outputs the first operation signal to the first load 13a in accordance with an instruction from the control unit 36. Upon input of the first operation signal from the output unit 31a, the first load 13a performs the first operation.

The output unit 31b outputs the second operation signal to the second load 13b in accordance with an instruction from the control unit 36. Upon input of the second operation signal from the output unit 31b, the second load 13b performs the second operation.

The output unit 32 outputs an OFF signal to the ECU 15 in accordance with an instruction from the control unit 36. Upon input of the OFF signal from the output unit 32, the ECU 15 turns the connection switch 16 off.

An activation signal and a deactivation signal are input to the input unit 34. Upon input of the activation signal, the input unit 34 notifies the control unit 36 of the input of the activation signal and the load indicated by the input activation signal. Similarly, upon input of the deactivation signal, the input unit 34 notifies the control unit 36 of the input of the deactivation signal and the load indicated by the input deactivation signal.

The storage unit 35 is a nonvolatile memory. In the storage unit 35, the value of a flag is stored. The value of the flag is 0 or 1, and is changed by the control unit 36. The flag having the value "0" means that the first switches 20a and the second switch 20b have been turned off normally. The flag having the value "1" means that at least one of the first switches 20a and the second switch 20b has not been turned off normally.

In the storage unit 35, a computer program P1 is further stored. The control unit 36 includes one or more Central Processing Units (CPUs). By executing the computer program P1, the one or more CPUs included in the control unit 36 executes power feeding control processing, first suppressing processing, and second suppressing processing.

The power feeding control processing is processing for controlling power feeding to each of the first load 13a and the second load 13b. The first suppressing processing is processing for suppressing, when at least one of the first switches 20a has not been turned off normally, an increase in the temperature of the first switches 20a. The second suppressing processing is processing for suppressing, when the second switch 20b has not been turned off normally, an increase in the temperature of the second switch 20b. The computer program P1 is used for the one or more CPUs included in the control unit 36 to execute the power feeding control processing, the first suppressing processing, and the second suppressing processing.

Note that the computer program P1 may also be stored in a storage medium A1 so as to be readable by the one or more CPUs included in the control unit 36. In this case, the computer program P1 read from the storage medium A1 by a not-shown reading device is written into the storage unit 35. The storage medium A1 is an optical disk, a flexible disk, a magnetic disk, a magneto-optical disk, a semiconductor memory, or the like. The optical disk is a Compact Disc (CD)-Read Only Memory (ROM), a Digital Versatile Disc (DVD)-ROM, a Blu-ray (registered trademark) Disc (BD), or the like. The magnetic disk is, for example, a hard disk. Alternatively, the computer program P1 may also be downloaded from a not-shown external device connected to a not-shown communication network, and the downloaded computer program P1 may be written into the storage unit 35.

Figure 3:
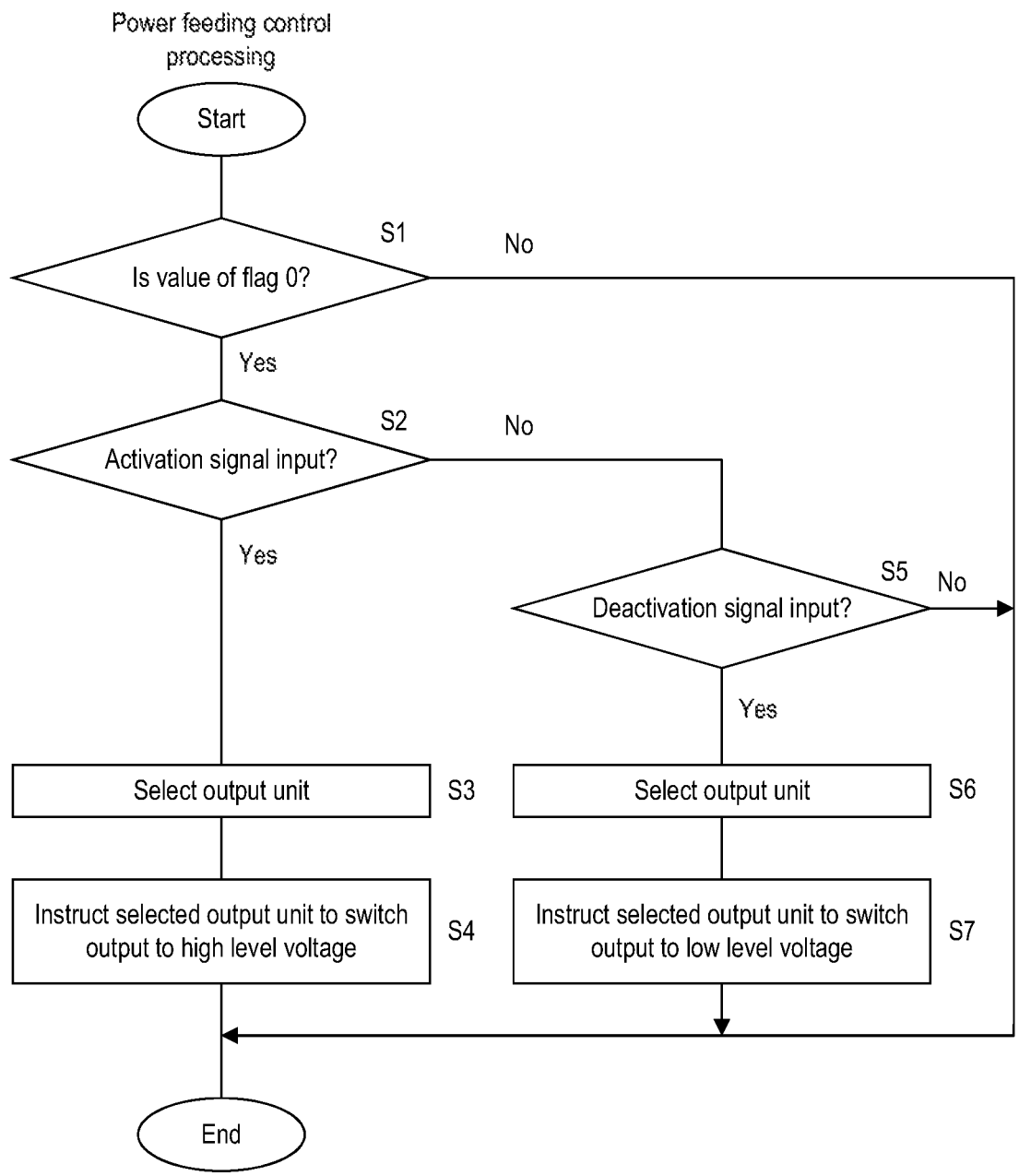
FIG. 3 is a flowchart illustrating a procedure of power feeding control processing.

FIG. 3 is a flowchart showing a procedure of the power feeding control processing. The control unit 36 periodically executes the power feeding control processing. The control unit 36 first determines whether or not the value of the flag is 0 (step S1). If it is determined that the value of the flag is 0 (YES in step S1), the control unit 36 determines whether or not an activation signal has been input to the input unit 34 (step S2).

If it is determined that an activation signal has been input to the input unit 34 (YES in step S2), the control unit 36 selects, based on the load indicated by the activation signal input to the input unit 34, at least one of the output units 30a and 30b (step S3). The output unit 30a corresponds to the first load 13a, and the output unit 30b corresponds to the second load 13b. In step S3, the output unit is selected that corresponds to the load indicated by the activation signal input to the input unit 34. If, for example, the activation signal indicates the first load 13a, the output unit 30a will be selected.

Then, the control unit 36 instructs the output unit selected in step S3 to switch its output to a high level voltage (step S4). In response thereto, the output unit selected in step S3 switches the voltage that it outputs to the high level voltage. For example, if the output unit 30a is selected by the control unit 36 in step S3, the control unit 36 instructs, in step S4, the output unit 30a to switch its output to the high level voltage. The output unit 30a switches the voltage that it outputs to the driving circuit 21a to the high level voltage, and the driving circuit 21a increases the first gate voltage. Accordingly, the first switches 20a are turned on.

Instructing the output unit 30a to switch its output to a high level voltage corresponds to giving an instruction to turn on the first switches 20a. Instructing the output unit 30b to switch its output to a high level voltage corresponds to giving an instruction to turn on the second switch 20b.

If it is determined that no activation signal has been input to the input unit 34 (NO in step S2), the control unit 36 determines whether or not a deactivation signal has been input to the input unit 34 (step S5). If it is determined that a deactivation signal has been input to the input unit 34 (YES in step S5), the control unit 36 selects, based on the load indicated by the deactivation signal input to the input unit 34, at least one of the output units 30a and 30b (step S6). In step S6, the output unit is selected that corresponds to the load indicated by the deactivation signal input to the input unit 34.

Then, the control unit 36 instructs the output unit selected in step S6 to switch its output to a low level voltage (step S7). Accordingly, the output unit selected in step S6 switches the voltage that it outputs to the low level voltage. For example, if the output unit 30a is selected by the control unit 36 in step S6, the control unit 36 instructs, in step S7, the output unit 30a to switch its output to the low level voltage. The output unit 30a switches the voltage that it outputs to the driving circuit 21a to the low level voltage, and the driving circuit 21a decreases the first gate voltage. Accordingly, the first switches 20a are turned off.

Instructing the output unit 30a to switch its output to a low level voltage corresponds to giving an instruction to turn off the first switches 20a. Instructing the output unit 30b to switch its output to a low level voltage corresponds to giving an instruction to turn off the second switch 20b. The control unit 36 functions as an instructing unit.

If it is determined that the value of the flag is not 0, that is, the value of the flag is 1 (NO in step S1), if it is determined that no deactivation signal has been input to the input unit 34 (NO in step S5), or after one of steps S4 and S7 has been executed, the control unit 36 ends the power feeding control processing.

As described above, in the power feeding control processing, if the value of the flag is 0, at least one of the first switches 20a and the second switch 20b is turned on based on the activation signal input to the input unit 34. Also, at least one of the first switches 20a and the second switch 20b is turned off based on the deactivation signal input to the input unit 34. In the power feeding control processing, if the value of the flag is 1, the first switches 20a and the second switch 20b are not turned on or off.

Figure 4:
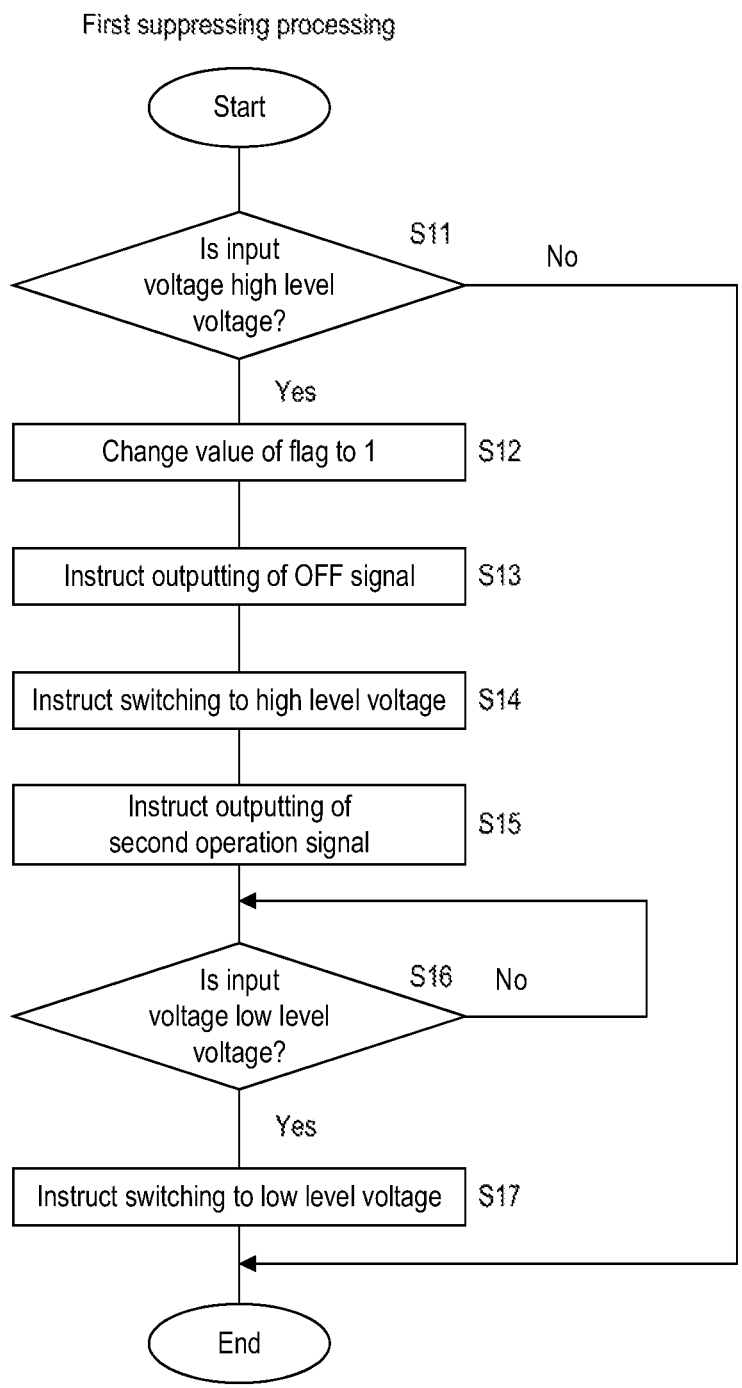
FIG. 4 is a flowchart illustrating a procedure of first suppressing processing.

FIG. 4 is a flowchart showing a procedure of the first suppressing processing. The control unit 36 periodically executes the first suppressing processing when having instructed the output unit 30a to switch its output to the low level voltage, that is, when having given an instruction to turn off the first switches 20a.

The control unit 36 determines whether or not the input voltage input to the input unit 33a from the comparator 22a is a high level voltage (step S11).

If a halfway-on failure occurs in at least one of the first switches 20a, the value of the resistance between the drain and the source of the at least one of the first switches 20a is not sufficiently large. Therefore, even when an instruction to turn off the first switches 20a has been given, a current flows through at least one of the first switches 20a. At this time, the first source voltage is equal to or greater than the first threshold voltage, and the comparator 22a outputs the high level voltage to the input unit 34. Determining whether or not the input voltage is a high level voltage corresponds to determining whether or not a current is flowing through at least one of the first switches 20a. The control unit 36 also functions as a determination unit.

If it is determined that the input voltage is a high level voltage (YES in step S11), the control unit 36 regards that at least one of the first switches 20a has not been turned off normally, and changes the value of the flag to 1 (step S12). Then, the control unit 36 instructs the output unit 32 to output an OFF signal (step S13). In response thereto, the output unit 32 outputs the OFF signal to the ECU 15, and the ECU 15 turns the connection switch 16 off. When the connection switch 16 is OFF, charging of the first capacitor 10 from each of the second capacitor 11 and the power generator 18, power feeding of the second capacitor 11 and the power generator 18 via the first switches 20a, and power feeding of the second capacitor 11 and the power generator 18 via the second switch 20b are prohibited. The output unit 32 functions as an off signal output unit.

Then, the control unit 36 instructs the output unit 30b to switch its output to a high level voltage (step S14). In response thereto, the output unit 30b switches the voltage that it outputs to the driving circuit 21b to the high level voltage, and the driving circuit 21b turns the second switch 20b on. When the second switch 20b is turned on, the first capacitor 10 discharges via a current path of a current flowing through the second switch 20b. Accordingly, the electric power accumulated in the first capacitor 10 is reduced, and the output voltage at the first capacitor 10 is reduced. The control unit 36 functions as a discharge control unit.

Then, the control unit 36 instructs the output unit 31b to output the second operation signal (step S15). In response thereto, the output unit 31b outputs the second operation signal, and the second load 13b executes the second operation. As a result, a notification on the failure is given. The output unit 31b functions as an operation signal output unit.

Then, the control unit 36 determines whether or not the input voltage input to the input unit 33a from the comparator 22a is a low level voltage (step S16). If it is determined that the input voltage is not a low level voltage (NO in step S16), the control unit 36 executes step S16 again, and waits until the input voltage is switched to the low level voltage. When the output voltage at the first capacitor 10 is reduced, the first source voltage is also reduced. When the first source voltage is less than the first threshold voltage, the input voltage input to the input unit 33a from the comparator 22a is switched to the low level voltage.

If it is determined that the input voltage is a low level voltage (YES in step S16), the control unit 36 instructs the output unit 30b to switch its output to the low level voltage (step S17). In response thereto, the output unit 30b switches the voltage that it outputs to the driving circuit 21b to the low level voltage, and the driving circuit 21b turns the second switch 20b off. This prevents the electric power accumulated in the first capacitor 10 from being reduced too much, and suppresses the deterioration of the first capacitor 10, that is, an increase in the internal resistance value of the first capacitor 10.

If it is determined that the input voltage is not a high level voltage, that is, if it is determined that the input voltage is a low level voltage (NO in step S11), or after step S17 has been executed, the control unit 36 ends the first suppressing processing.

As described above, in the first suppressing processing, when the control unit 36 has given an instruction to turn off the first switches 20a, if a current is flowing through the first switches 20a, each of the connection switch 16 and the second switch 20b is turned on and off, and the output voltage at the first capacitor 10 is reduced. Furthermore, the second load 13b executes the second operation, and a notification on the failure is given.

The control unit 36 executes the second suppressing processing, similar to the first suppressing processing. When having instructed the output unit 30b to switch its output to the low level voltage, that is, when having given an instruction to turn off the second switch 20b, the control unit 36 periodically executes the second suppressing processing. If it is determined that the input voltage input to the input unit 33b from the comparator 22b is the high level voltage, the control unit 36 changes the value of the flag to 1, and instructs the output unit 32 to output an OFF signal.

Furthermore, the control unit 36 instructs the output unit 30a to switch its output to the high level voltage, and the driving circuit 21a turns the first switches 20a on. The control unit 36 instructs the output unit 31a to output the first operation signal, and the output unit 31a outputs the first operation signal to the first load 13a. The output unit 31a also functions as the operation signal output unit.

When the input voltage has been switched to the low level voltage, the control unit 36 instructs the output unit 30b to switch its output to the low level voltage, and the driving circuit 21a turns the first switches 20a off. If it is determined in the first step of the second suppressing processing that the input voltage is a low level voltage, or after the output unit 30b has been instructed to switch its output to the low level voltage, the control unit 36 ends the second suppressing processing.

The first switches 20a and the second switch 20b each function as a semiconductor switch and also as a current switch. The current path of a current flowing from the first capacitor 10 to the first switches 20a functions as a first current path and also a second current path. Similarly, the current path of a current flowing from first capacitor 10 to the second switch 20b functions as the first current path and also as the second current path.

Figure 5:
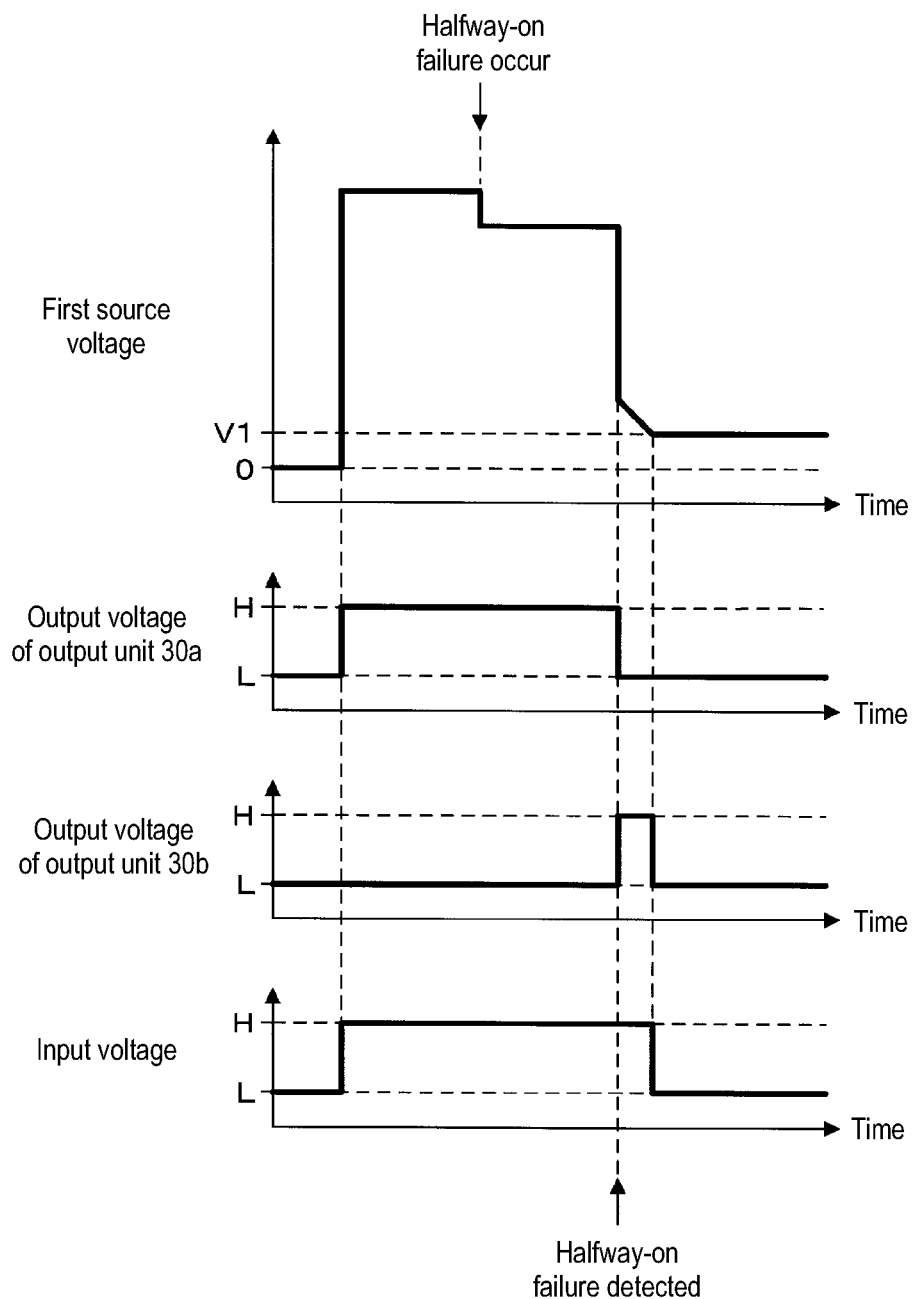
FIG. 5 is a timing chart illustrating an example of an operation of the power feeding control device.

FIG. 5 is a timing chart showing an example of an operation of the power feeding control device 12. In FIG. 5, the run of the first source voltage, the run of the output voltage at the output units 30a and 30b, and the run of the input voltage input to the input unit 33a from the comparator 22a are shown. In FIG. 5, the first threshold voltage is denoted by "V1", the high level voltage is denoted by "H", and the low level voltage is denoted by "L".

When the output voltage output to the driving circuit 21a by the output unit 30a is the low level voltage, the first source voltage is 0V, and is less than the first threshold voltage V1. Accordingly, the input voltage input to the input unit 33a from the comparator 22a is the low level voltage. It is assumed that the output voltage output to the driving circuit 21b by the output unit 30b is the low level voltage, and the second switch 20b is OFF.

In the power feeding control processing, when the control unit 36 has instructed the output unit 30a to switch its output to the high level voltage, the output unit 30a switches the output voltage to the high level voltage, and the driving circuit 21a increases the first gate voltage, so that the first switches 20a are turned on. At this time, a current flows through the first switches 20a, the first source voltage increases to the first threshold voltage V1 or more, and the input voltage is switched to the high level voltage. If a halfway-on failure occurs in one of the first switches 20a, the combined resistance value of the first switches 20a will increase and the first source voltage will decrease.

In the power feeding control processing, when the control unit 36 has instructed the output unit 30a to switch its output to the low level voltage, the output unit 30a switches the output voltage to the low level voltage, and the driving circuit 21a reduces the first gate voltage. At this time, since the halfway-on failure has occurred in one of the first switches 20a, a current continues to flow through the first switch 20a in which the halfway-on failure has occurred, the first source voltage remains at the first threshold voltage V1 or more, and the input voltage remains at the high level voltage. At this time, the control unit 36 regards that a current is flowing through at least one of the first switches 20a when an instruction to turn off the first switches 20a has been given, and thereby the control unit 36 detects the halfway-on failure, and changes the value of the flag to 1.

When a halfway-on failure is detected, the control unit 36 instructs the output unit 32 to output an OFF signal, the output unit 32 outputs the OFF signal to the ECU 15, and the ECU 15 turns the connection switch 16 off. Accordingly, charging of the first capacitor 10 from each of the second capacitor 11 and the power generator 18, power feeding of the second capacitor 11 and the power generator 18 via the first switches 20a, and power feeding of the second capacitor 11 and the power generator 18 via the second switch 20b are prohibited. Then, the control unit 36 instructs the output unit 30b to switch its output to the high level voltage, the output unit 30b switches the output voltage to the high level voltage, and the driving circuit 21b turns the second switch 20b on.

When the second switch 20b has been turned on, the first capacitor 10 discharges via a current path of a current flowing through the second switch 20b in a state in which the connection switch 16 is OFF, and the output voltage at the first capacitor 10 is reduced with time. Therefore, the first source voltage is also reduced. When the first source voltage is less than the first threshold voltage V1, the input voltage is switched to the low level voltage, and thus the control unit 36 instructs the output unit 30b to switch its output to the low level voltage. In response thereto, the output unit 30b switches the output voltage to the low level voltage, and the driving circuit 21b turns the second switch 20b off. Then, since the value of the flag is 1, the output units 30a and 30b maintain the output voltage at the low level voltage, and the first switches 20a and the second switch 20b remain OFF.

As described above, the first threshold voltage V1 is equal to or less than the first operation voltage. Accordingly, if the first source voltage is less than the first threshold voltage V1, the first source voltage is less than the first operation voltage, and the first load 13a is deactivated. Accordingly, if the first source voltage is less than first threshold voltage V1, a current hardly flows through the first switches 20a, and the temperature of the first switches 20a hardly increases. The electric power accumulated in the first capacitor 10 is not reduced too much, and the deterioration of the first capacitor 10 is suppressed.

When a halfway-on failure is detected by the control unit 36, the output unit 31b outputs the second operation signal to the second load 13b, and the second load 13b executes the second operation to give a notification on the failure that has occurred. When the second switch 20b is turned off, the second load 13b is deactivated.

Note that, even if the output voltage at the first capacitor 10 is reduced, the third load 14, which is an electric device essential for operation of the vehicle, is supplied with electric power from the power generator 18 or the second capacitor 11. Therefore, a driver can safely drive the vehicle.

The amount of heat generation of the first switch 20a is larger, the larger the product of the square of the current value of a current flowing through the first switch 20a, and the value of the resistance between the drain and the source of the first switch 20a is. If the output voltage at the first capacitor 10 is reduced, the current value of a current flowing through the first switch 20a in which the halfway-on failure has occurred is reduced, and an increase in the temperature of the first switch 20a is suppressed.

Embodiment 2

In Embodiment 1, if a halfway-on failure occurs in at least one of the first switches 20a, the first capacitor 10 discharges via a current path of a current flowing to the second load 13b. However, the current path used for the first capacitor 10 to discharge is not limited to the current path of the current flowing to the second load 13b.

The following will describe Embodiment 2 focusing on the differences from Embodiment 1. Configurations other than the following configurations are the same as those in Embodiment 1. Therefore, constituent units that are the same as those in Embodiment 1 are denoted using the same reference numerals as those used in Embodiment 1 and descriptions thereof are omitted.

Figure 6:
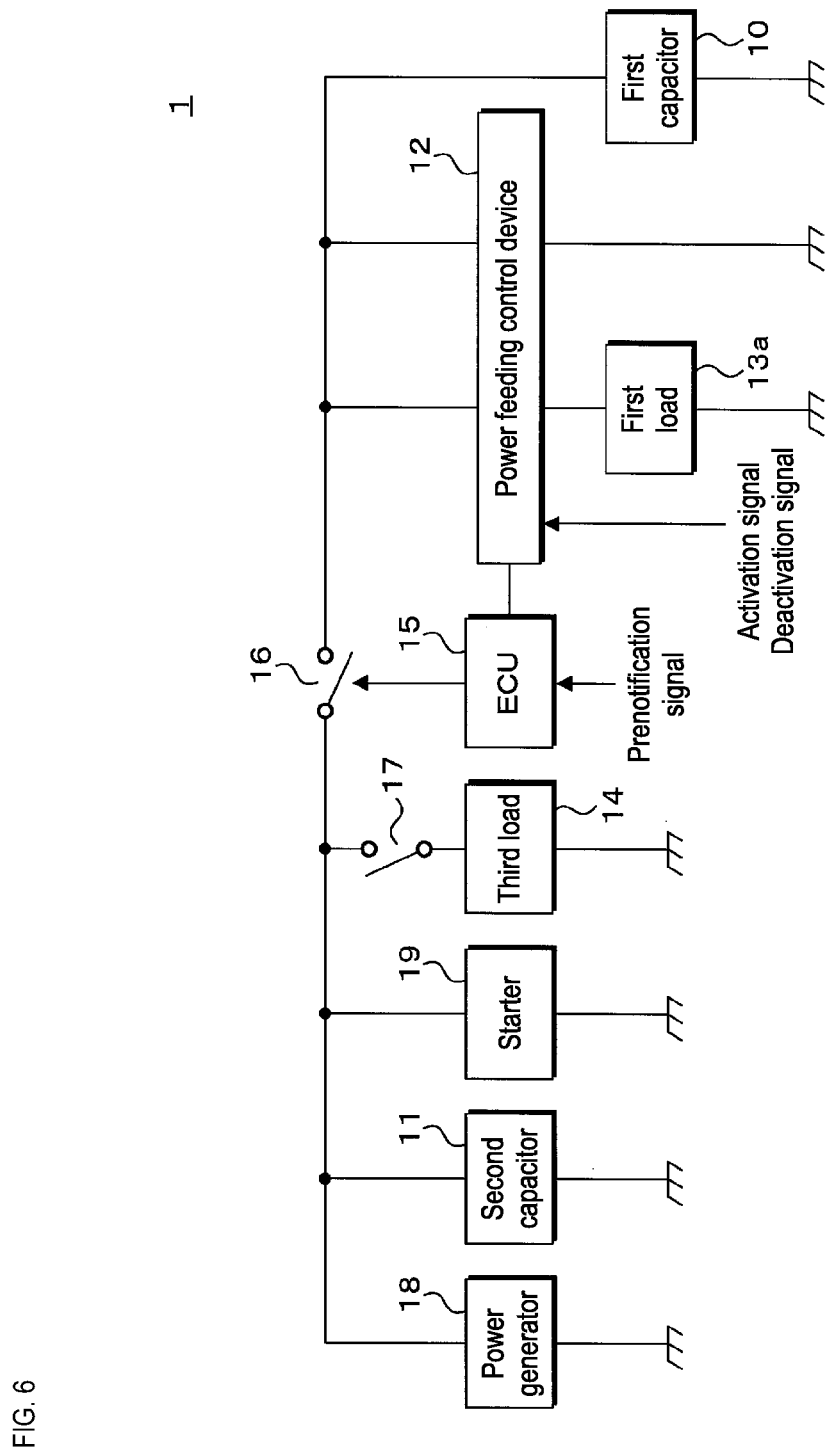
FIG. 6 is a block diagram illustrating a configuration of a main portion of a power supply system according to Embodiment 2.

FIG. 6 is a block diagram showing a configuration of a main portion of a power supply system 1 according to Embodiment 2. The power supply system 1 of Embodiment 2 differs from the power supply system 1 of Embodiment 1 as to whether or not the second load 13b is connected to the power feeding control device 12. In the power supply system 1 of Embodiment 2, no second load 13b is connected to the power feeding control device 12, and the power feeding control device 12 is grounded.

The power feeding control device 12 controls power feeding to the first load 13a. An activation signal for instructing activation of the first load 13a, and a deactivation signal for instructing deactivation of the first load 13a are input to the power feeding control device 12. Upon input of the activation signal, the power feeding control device 12 electrically connects a connection node between the first capacitor 10 and the connection switch 16, to the first load 13a. Accordingly, electric power is fed to the first load 13a, and the first load 13a is activated. Upon input of the deactivation signal, the power feeding control device 12 interrupts the electrical connection between the connection node between the first capacitor 10 and the connection switch 16, and the first load 13a. Accordingly, the power feeding to the first load 13a is stopped, and the load indicated by the deactivation signal is deactivated. Furthermore, the power feeding control device 12 does not output a first operation signal and a second operation signal.

Figure 7:
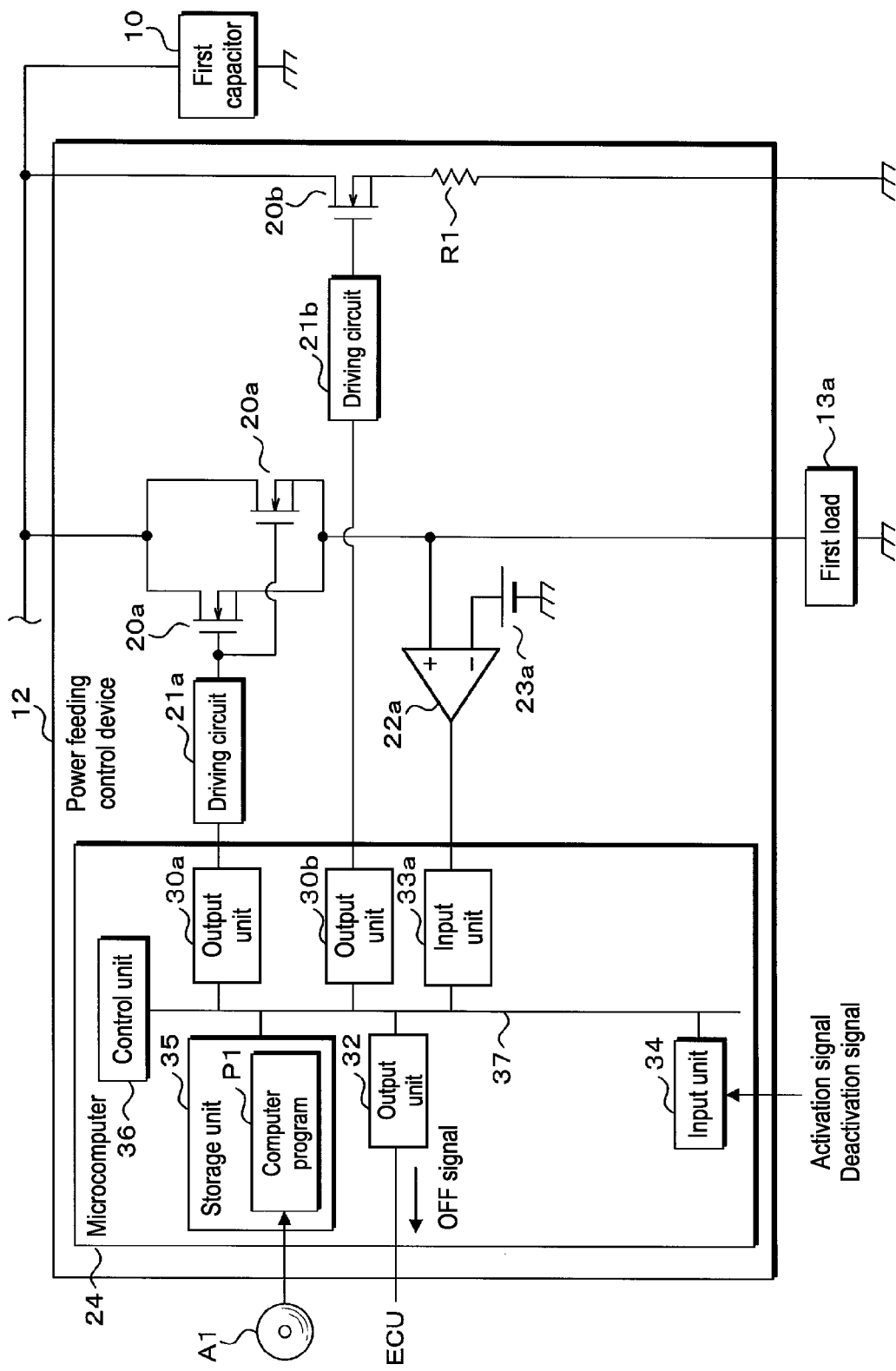
FIG. 7 is a block diagram illustrating a configuration of a main portion of a power feeding control device.

FIG. 7 is a block diagram showing a configuration of a main portion of the power feeding control device 12. As in Embodiment 1, the power feeding control device 12 of Embodiment 2 includes the first switches 20a, the second switch 20b, the driving circuits 21a and 21b, the comparator 22a, the DC power supply 23a, and the microcomputer 24. The power feeding control device 12 of the Embodiment 2 includes a resistor R1, instead of the comparator 22b and the DC power supply 23b. Similar to Embodiment 1, the microcomputer 24 of Embodiment 2 includes the output unit 30a, 30b, and 32, the input units 33a and 34, the storage unit 35, and the control unit 36.

One end of the resistor R1 is connected to the source of the second switch 20b. The other end of the resistor R1 is grounded. The driving circuit 21b turns the second switch 20b on in a state in which the connection switch 16 is OFF. When the second switch 20b is ON, a current flows from the first capacitor 10 through the second switch 20b and the resistor R1 in this order, and the first capacitor 10 discharges.

One or more CPUs included in the control unit 36 of the microcomputer 24 executes power feeding control processing and first suppressing processing, by executing the computer program P1. While the value of the flag is 0, the second switch 20b remains OFF. In Embodiment 2, the flag having the value "0" means that the first switches 20a have normally been turned off. The flag having the value "1" means that at least one of the first switches 20a has not been turned off normally.

Figure 8:
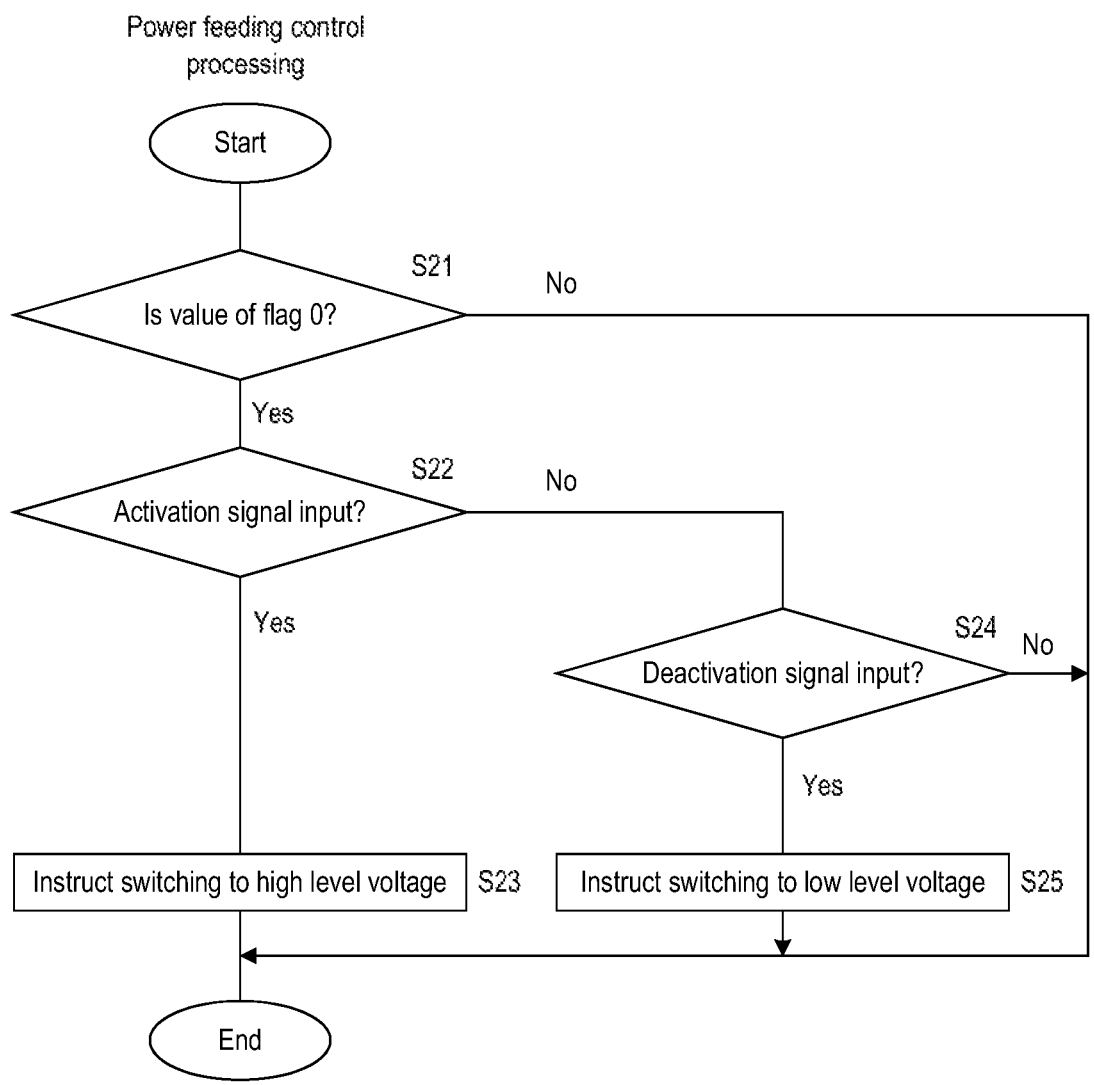
FIG. 8 is a flowchart illustrating a procedure of power feeding control processing.

FIG. 8 is a flowchart showing a procedure of the power feeding control processing. As in Embodiment 1, the control unit 36 periodically executes the power feeding control processing. The control unit 36 first determines whether or not the value of the flag is 0 (step S21). If it is determined that the value of the flag is 0 (YES in step S21), the control unit 36 determines whether or not an activation signal has been input to the input unit 34 (step S22).

If it is determined that an activation signal has been input to the input unit 34 (YES in step S22), the control unit 36 instructs the output unit 30a to switch its output to the high level voltage (step S23). In response thereto, the output unit 30a switches the voltage that it outputs to the driving circuit 21a to the high level voltage, and the driving circuit 21a increases the first gate voltage, so that the first switches 20a are turned on. Accordingly, electric power is fed to the first load 13a, and the first load 13a is activated.

If it is determined that no activation signal has been input to the input unit 34 (NO in step S22), the control unit 36 determines whether or not a deactivation signal has been input to the input unit 34 (step S24). If it is determined that a deactivation signal has been input to the input unit 34 (YES in step S24), the control unit 36 instructs the output unit 30a to switch its output to the low level voltage (step S25). In response thereto, the output unit 30a switches the voltage that it outputs to the driving circuit 21a to the low level voltage, and the driving circuit 21a reduces the first gate voltage, so that the first switches 20a are turned off. Accordingly, the power feeding to the first load 13a is stopped, and the first load 13a is deactivated.

If it is determined that the value of the flag is not 0 (NO in step S21), if it is determined that no deactivation signal has been input to the input unit 34 (NO in step S24), or after one of steps S23 and S25 has been executed, the control unit 36 ends the power feeding control processing.

As described above, in the power feeding control processing, if the value of the flag is 0, the first switches 20a are turned on or off based on a signal input to the input unit 34. In the power feeding control processing, if the value of the flag is 1, the first switches 20a are not turned on or off.

As in Embodiment 1, the control unit 36 executes the first suppressing processing. The control unit 36 instructs the output unit 30b to switch its output to the high level voltage, the output unit 30b switches the output voltage to the high level voltage, and the driving circuit 21b turns the second switch 20b on. When the second switch 20b is ON, the first capacitor 10 discharges via the second switch 20b and the resistor R1, and the output voltage at the first capacitor 10 is reduced with time. When the output voltage at the first capacitor 10 is reduced, the first source voltage is reduced. If the first source voltage is less than the first threshold voltage, the control unit 36 instructs the output unit 30b to switch its output to the low level voltage, the output unit 30b switches the output voltage to the low level voltage, and the driving circuit 21b turns the second switch 20b off.

As described above, in the power feeding control device 12 of Embodiment 2, a current path is provided that is dedicated for the first capacitor 10 to discharge, if the first source voltage is equal to or greater than the first threshold voltage when the control unit 36 has given an instruction to turn on the first switches 20a.

The power feeding control device 12 of Embodiment 2 can also achieve the effects achieved by the power feeding control device 12 of Embodiment 1 except for the effects obtained by outputting the second operation signal.

Note that in the first suppressing processing according to Embodiments 1 and 2, if it is determined that the input voltage input to the input unit 33a from the comparator 22a is the high level voltage, the control unit 36 may also instruct the output unit 30a to switch its output to the high level voltage, that is, the control unit 36 may also give an instruction to turn on the first switches 20a. When the control unit 36 has instructed the output unit 30a to switch its output to the high level voltage, the output unit 30a switches the voltage that it outputs to the driving circuit 21a to the high level voltage. In this case, if the first switches 20a include a normal first switch 20a, the driving circuit 21a turns the normal first switch 20a on. Accordingly, the first capacitor 10 discharges via the current path of a current flowing through the normal first switch 20a, instead of the current path of a current flowing through the second switch 20b. As a result, it is possible to rapidly reduce the output voltage at the first capacitor 10.

Furthermore, in the first suppressing processing according to Embodiments 1 and 2, the control unit 36 may also maintain the connection switch 16 in the ON state, without executing step S13. In this configuration, in a state in which it is ensured that the power generator 18 does not generate power, that is, in a state in which the engine is deactivated, the control unit 36, when having given an instruction to turn off the first switches 20a, periodically executes the first suppressing processing. In this case, when the driving circuit 21b turns the second switch 20b on, the first capacitor 10 and the second capacitor 11 discharge. Therefore, the output voltages of the first capacitor 10 and the second capacitor 11 are reduced.

Similarly, in the second suppressing processing according to Embodiment 1, the control unit 36 may also maintain the connection switch 16 in the ON state. Also in this configuration, in a state in which it is ensured that the power generator 18 does not generate power, the control unit 36, when having given an instruction to turn off the second switch 20b, periodically executes the second suppressing processing. In this case, when the driving circuit 21a turns the first switches 20a on, the first capacitor 10 and the second capacitor 11 discharge. Accordingly, the output voltages of the first capacitor 10 and the second capacitor 11 are reduced.

In Embodiments 1 and 2, the first threshold voltage is not limited to a voltage that is equal to or less than the first operation voltage. In this case, in the first suppressing processing, the output unit 30a is instructed to switch its output to the low level voltage, if the first source voltage is less than a constant voltage that is equal to or less than the first operation voltage, rather than if the input voltage is switched to the low level voltage, that is, if the first source voltage is less than the first threshold voltage.

Similarly, the second threshold voltage is not limited to a voltage that is equal to or less than the second operation voltage. In this case, in the second suppressing processing, the output unit 30b is instructed to switch its output to the low level voltage, if the voltage at the source of the second switch 20b relative to the ground potential is less than a constant voltage that is equal to or less than the second operation voltage, rather than if the input voltage is switched to the low level voltage, that is, the voltage at this source of the second switch 20b is less than the second threshold voltage.

Embodiment 3

In Embodiments 1 and 2, if at least one of the first switches 20a is not turned on normally, the control unit 36 causes the first capacitor 10 to discharge. However, the control unit 36 may also cause the first capacitor 10 to stop discharging, instead of causing the first capacitor 10 to discharge.

The following will describe Embodiment 3 focusing on the differences from Embodiment 2. Configurations other than the following configurations are the same as those in Embodiment 2. Therefore, constituent units that are the same as those in Embodiment 2 are denoted using the same reference numerals as those used in Embodiment 2 and descriptions thereof are omitted.

Figure 9:
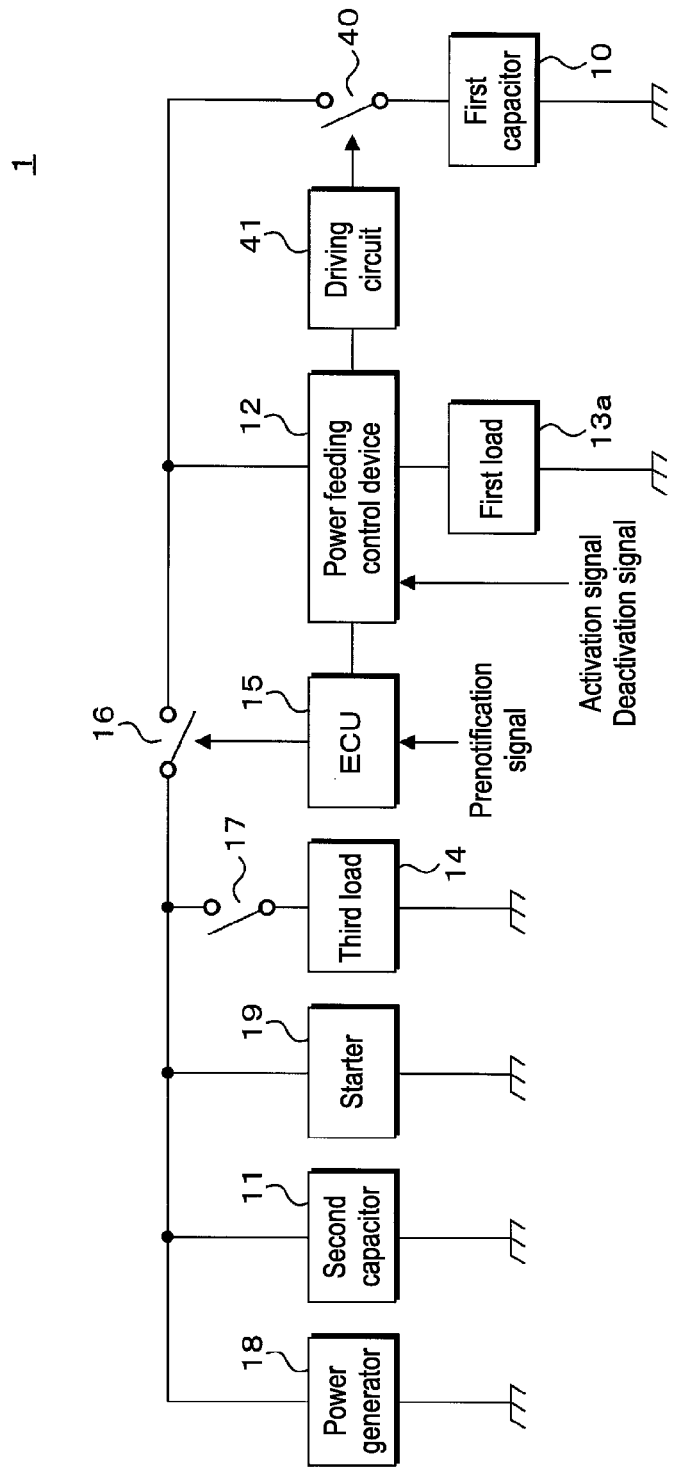
FIG. 9 is a block diagram illustrating a configuration of a main portion of a power supply system according to Embodiment 3.

FIG. 9 is a block diagram showing a configuration of a main portion of a power supply system 1 according to Embodiment 3. The power supply system 1 of Embodiment 3 includes, in addition to the constituent units of the power supply system 1 of Embodiment 2, an input/output switch 40 and a driving circuit 41. One end of the input/output switch 40 is connected to the power feeding control device 12 and one end of the connection switch 16. The other end of the input/output switch 40 is connected to the positive electrode of the first capacitor 10. The driving circuit 41 is connected to the power feeding control device 12.

If the first switches 20a are turned off normally, that is, if the value of the flag is 0, the power feeding control device 12 outputs the high level voltage to the driving circuit 41. In this case, the driving circuit 41 maintains the input/output switch 40 in the ON state. When the input/output switch 40 is ON, charging and discharging of the first capacitor 10 are performed, as in Embodiment 2, that is, as in Embodiment 1.

If at least one of the first switches 20a is not turned on normally, the power feeding control device 12 changes the value of the flag to 1, and switches the voltage that is output to the driving circuit 41 from the high level voltage to a low level voltage. When the power feeding control device 12 has switched the voltage that is output to the driving circuit 41 from the high level voltage to the low level voltage, the driving circuit 41 turns the input/output switch 40 off. When the input/output switch 40 is OFF, charging of the first capacitor 10 is prohibited, and discharge of the first capacitor 10 is stopped.

Figure 10:
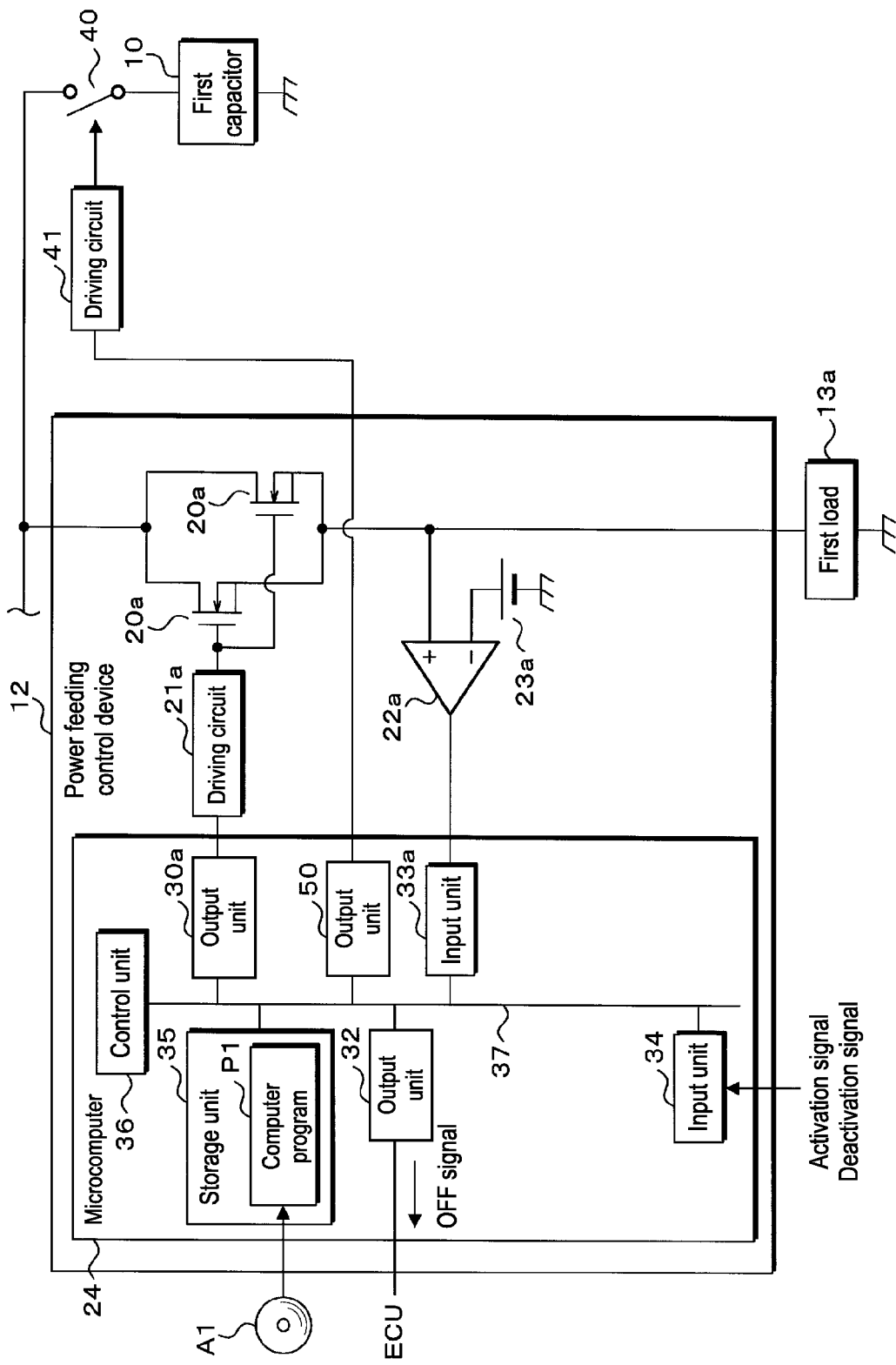
FIG. 10 is a block diagram illustrating a configuration of a main portion of a power feeding control device.

FIG. 10 is a block diagram showing a configuration of a main portion of the power feeding control device 12. As in Embodiment 2, the power feeding control device 12 of Embodiment 3 includes the first switches 20a, the driving circuit 21a, the comparator 22a, the DC power supply 23a, and the microcomputer 24. As in Embodiment 2, the microcomputer 24 of Embodiment 3 includes the output units 30a and 32, the input units 33a and 34, the storage unit 35, and the control unit 36. These are connected to the internal bus 37. The microcomputer 24 further includes an output unit 50. The output unit 50 is connected to the internal bus 37 and the driving circuit 41.

If the value of the flag is 0, the output unit 50 outputs the high level voltage to the driving circuit 41. The control unit 36 instructs the output unit 50 to switch its output to the low level voltage. In this case, the output unit 50 switches the voltage that it outputs to the driving circuit 41 to the low level voltage, and the driving circuit 41 turns the input/output switch 40 off. Instructing the output unit 50 to switch its output to the low level voltage corresponds to giving an instruction to turn off the input/output switch 40.

By executing the computer program P1, the control unit 36 executes power feeding control processing and first suppressing processing. The power feeding control processing of Embodiment 3 is the same as that of Embodiment 1.

Figure 11:
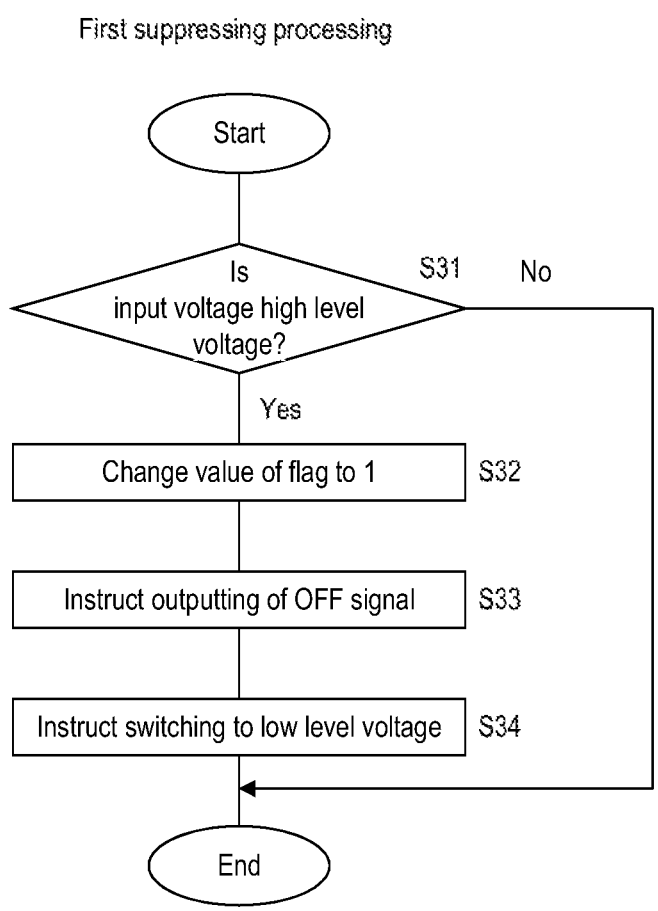
FIG. 11 is a flowchart illustrating a procedure of first suppressing processing.

FIG. 11 is a flowchart showing a procedure of the first suppressing processing. As in Embodiment 2, that is, as in Embodiment 1, the control unit 36 periodically executes the first suppressing processing when having instructed the output unit 30a to switch its output to the low level voltage. Steps S31 to S33 of the first suppressing processing of Embodiment 3 are the same as steps S11 to S13 of the first suppressing processing of Embodiment 2, that is, Embodiment 1. Accordingly, detailed descriptions of steps S31 to S33 are omitted.

If the flag is 0, that is, until the value of the flag is changed to 1 in the first suppressing processing, the output unit 50 outputs the high level voltage to the driving circuit 41, and the driving circuit 41 maintains the input/output switch 40 in the ON state.

In the first suppressing processing, after having executed step S33, the control unit 36 instructs the output unit 50 to switch its output to the low level voltage (step S34). In response thereto, the output unit 50 switches the voltage that it outputs to the driving circuit 41 from the high level voltage to the low level voltage, and the driving circuit 41 switches the input/output switch 40 from ON to OFF. As described above, when the input/output switch 40 has been turned off, the first capacitor 10 stops discharging. If it is determined that the input voltage input to the input unit 33a from the comparator 22a is not the high level voltage, that is, the low level voltage (NO in step S31), or after step S34 has been executed, the control unit 36 ends the first suppressing processing.

As described above, in the first suppressing processing, in a case where an instruction to turn off the first switches 20a has been given, if the first source voltage is equal to or greater than the first threshold voltage, the control unit 36 determines that a current is flowing through at least one of the first switches 20a. In this case, the control unit 36 instructs the output unit 50 to switch its output to a low level voltage. Accordingly, the driving circuit 41 turns the input/output switch 40 off, and the first capacitor 10 stops discharging.

Note that the first threshold voltage is not necessarily equal to or less than the first operation voltage.

If a halfway-on failure occurs in one of the first switches 20a, a current will flow through the first switch 20a in which the halfway-on failure is occurring, even when the control unit 36 has given an instruction to turn off the first switches 20a. Accordingly, the first source voltage increases to the first threshold voltage or greater, and the control unit 36 determines that a current is flowing through at least one of the first switches 20a.

If it is determined that a current is flowing through at least one of the first switches 20a, the control unit 36 instructs the output unit 32 to output an OFF signal, and the ECU 15 turns the connection switch 16 off. Accordingly, the power feeding to the first load 13a from the second capacitor 11 and the power generator 18 is prohibited. If it is determined that a current is flowing through at least one of the first switches 20a, the control unit 36 further instructs the output unit 50 to turn the input/output switch 40 off, and the driving circuit 41 turns the input/output switch 40 off. As a result, in a state in which the connection switch 16 is OFF, the first capacitor 10 stops discharging, and the current value of a current flowing through the first switch 20a in which the halfway-on failure has occurred is reduced, thereby suppressing an increase in the temperature of the first switch 20a.

The power feeding control device 12 of Embodiment 3 also achieves the effects achieved by the power feeding control device 12 of Embodiment 2.

Furthermore, in the first suppressing processing of Embodiment 3, the control unit 36 may also maintain the connection switch 16 in the ON state, without executing step S33. In this configuration, a second input/output switch is provided at the positive electrode of the second capacitor 11. Similar to the input/output switch 40, the second input/output switch remains ON when the value of the flag is 0. In a state in which the power generator 18 does not generate power, the control unit 36, when having given an instruction to turn off the first switches 20a, periodically executes the first suppressing processing. In this first suppressing processing, the control unit 36 gives an instruction to turn off the input/output switch 40, and an instruction to turn off the second input/output switch. When the second input/output switch is turned off, the discharge of the second capacitor 11 is stopped.

In Embodiments 1 to 3, each power supply system 1 may also have a configuration in which the second capacitor 11, the third load 14, the ECU 15, the connection switch 16, the power feeding switch 17, the power generator 18, and the starter 19 are omitted. Even in this case, such power feeding control devices 12 of Embodiments 1 to 3 have the same effects as those explained in the descriptions of Embodiments 1 to 3. In each of the power feeding control devices 12, in the processing executed by the control unit 36, processing for giving an instruction to output an OFF signal is omitted.

In Embodiments 1 to 3, the control unit 36 determines whether or not a current is flowing through the first switches 20a, based on whether or not the comparator 22a outputs the high level voltage, that is, whether or not the first source voltage is equal to or greater than the first threshold voltage. However, the control unit 36 may also determine whether or not a current is flowing through the first switches 20a, based on a current value of the current flowing through the first switches 20a. If, for example, the current value exceeds 0A, the control unit 36 may determine that a current is flowing through the first switches 20a. In this case, a current sensor, a shunt resistor, or the like is used to detect a current value.

Similarly, in Embodiment 1, the control unit 36 may also determine whether or not a current is flowing through the second switch 20b, based on a current value of the current flowing through the second switch 20b. Also in this case, a current sensor, a shunt resistor, or the like is used to detect the current value.

Furthermore, in Embodiments 1 to 3, the first switch 20a may also be a semiconductor switch that is different from an N-channel type FET. In Embodiment 1, the second switch 20b may also be a semiconductor switch that is different from an N-channel type FET. Examples of the semiconductor switch that is different from an N-channel type FET include a P-channel type FET and a bipolar transistor. Also, the second switch 20b of Embodiment 2 needs only to function as a switch, and thus the second switch 20b is not limited to the N-channel type FET, and may also be a P-channel type FET, a bipolar transistor, a relay contact, or the like.

Furthermore, in Embodiments 1 to 3, the number of first switches 20a is not limited to 2, and may be 1, or 3 or more. If the number of first switches 20a is 3 or more, these first switches 20a are connected in parallel, and are turned on or off by the driving circuit 21a at substantially the same time. Furthermore, in Embodiment 1, the number of second switches 20b is not limited to 1, and may also be 2 or more. In this case, the plurality of second switches 20b, similar to the first switches 20a, are connected in parallel, and are turned on or off by the driving circuit 21b at substantially the same time.

Disclosed Embodiments 1 to 3 are illustrative examples in all aspects and should not be considered as restrictive. The scope of the present invention is defined not by the above descriptions but by the claims, and is intended to encompass all modifications within the meanings and scope that are equivalent to the claims.

The invention claimed is:

1. A power feeding control device comprising:
   a semiconductor switch provided in a first current path of a current flowing from a capacitor to a first load;
   an instructing unit configured to give an instruction to turn off the semiconductor switch;

a determination unit configured to determine whether or not a current is flowing through the semiconductor switch, when the instructing unit has given an instruction to turn off the semiconductor switch;

a discharge control unit configured to, if it is determined by the determination unit that a current is flowing, cause the capacitor to discharge via a second current path of a current flowing from the capacitor to a second load, which is different from the first load, the second load including an interior light or a rear windshield wiper; and an operation signal output unit configured to, if it is determined by the determination unit that a current is flowing, output an operation signal for instructing the second load to perform a predetermined operation.

2. The power feeding control device according to claim 1, wherein the determination unit determines that a current is flowing, if a voltage at one terminal, on the downstream side, of the semiconductor switch is equal to or greater than a predetermined voltage when the instructing unit has given an instruction to turn off the semiconductor switch.

3. The power feeding control device according to claim 1, wherein a power generator charges the capacitor via a connection switch, and supplies electric power via the connection switch and the semiconductor switch, and the power feeding control device further comprises an off signal output unit configured to, if it is determined by the determination unit that a current is flowing, output an off signal for giving an instruction to turn off the connection switch.

4. The power feeding control device according to claim 1, further comprising:

a current switch provided in the second current path, wherein, by giving an instruction to turn on the current switch, the discharge control unit causes the capacitor to discharge via the second current path.

5. A power feeding control method comprising the steps of:

giving an instruction to turn off a semiconductor switch provided in a first current path of a current flowing from a capacitor to a first load;

determining whether or not a current is flowing through the semiconductor switch, when an instruction to turn off the semiconductor switch has been given;

if it is determined that a current is flowing, causing the capacitor to discharge via a second current path of a current flowing from the capacitor to a second load, which is different from the first load, the second load including an interior light or a rear windshield wiper; and if it is determined that a current is flowing, outputting an operation signal for instructing the second load to perform a predetermined operation.

6. A non-transitory computer program for causing a computer to execute the steps of:

giving an instruction to turn off a semiconductor switch provided in a first current path of a current flowing from a capacitor to a first load;

determining whether or not a current is flowing through the semiconductor switch, when an instruction to turn off the semiconductor switch has been given;

if it is determined that a current is flowing, causing the capacitor to discharge via a second current path of a current flowing from the capacitor to a second load, which is different from the first load, the second load including an interior light or a rear windshield wiper; and if it is determined that a current is flowing, outputting an operation signal for instructing the second load to perform a predetermined operation.

7. The power feeding control device according to claim 2, wherein a power generator charges the capacitor via a connection switch, and supplies electric power via the connection switch and the semiconductor switch, and the power feeding control device further comprises an off signal output unit configured to, if it is determined by the determination unit that a current is flowing, output an off signal for giving an instruction to turn off the connection switch.

8. The power feeding control device according to claim 2, further comprising:

a current switch provided in the second current path, wherein, by giving an instruction to turn on the current switch, the discharge control unit causes the capacitor to discharge via the second current path.

9. The power feeding control device according to claim 3, further comprising:

a current switch provided in the second current path, wherein, by giving an instruction to turn on the current switch, the discharge control unit causes the capacitor to discharge via the second current path.

* * * * *